W. H. GILL.

CLOCK ASSEMBLING MACHINE.

APPLICATION FILED DEC. 6, 1911.

1,048,821. Patented Dec. 31, 1912.

Witnesses:

S. H. Clarke

Roger Edwards

Inventor

William H. Gill.

By Louis W. Schmidt

Atty.

COLUMBIA PLANOGRAPH CO., WASHINGTON, D. C.

W. H. GILL.
CLOCK ASSEMBLING MACHINE.
APPLICATION FILED DEC. 6, 1911.

1,048,821.

Patented Dec. 31, 1912.

Witnesses:
S. H. Clarke
Roger Edwards.

Inventor
William H. Gill.
By Louis M. Schmidt
Atty

COLUMBIA PLANOGRAPH CO., WASHINGTON, D. C.

W. H. GILL.

CLOCK ASSEMBLING MACHINE.

APPLICATION FILED DEC. 6, 1911.

1,048,821.

Patented Dec. 31, 1912.

Witnesses:-
S. H. Clarke
Roya Edwards

Inventor
William H. Gill
By Louis M. Schmidt
Atty.

COLUMBIA PLANOGRAPH CO., WASHINGTON, D. C.

W. H. GILL.
CLOCK ASSEMBLING MACHINE.
APPLICATION FILED DEC. 6, 1911.
1,048,821.
Patented Dec. 31, 1912.
7 SHEETS—SHEET 4.
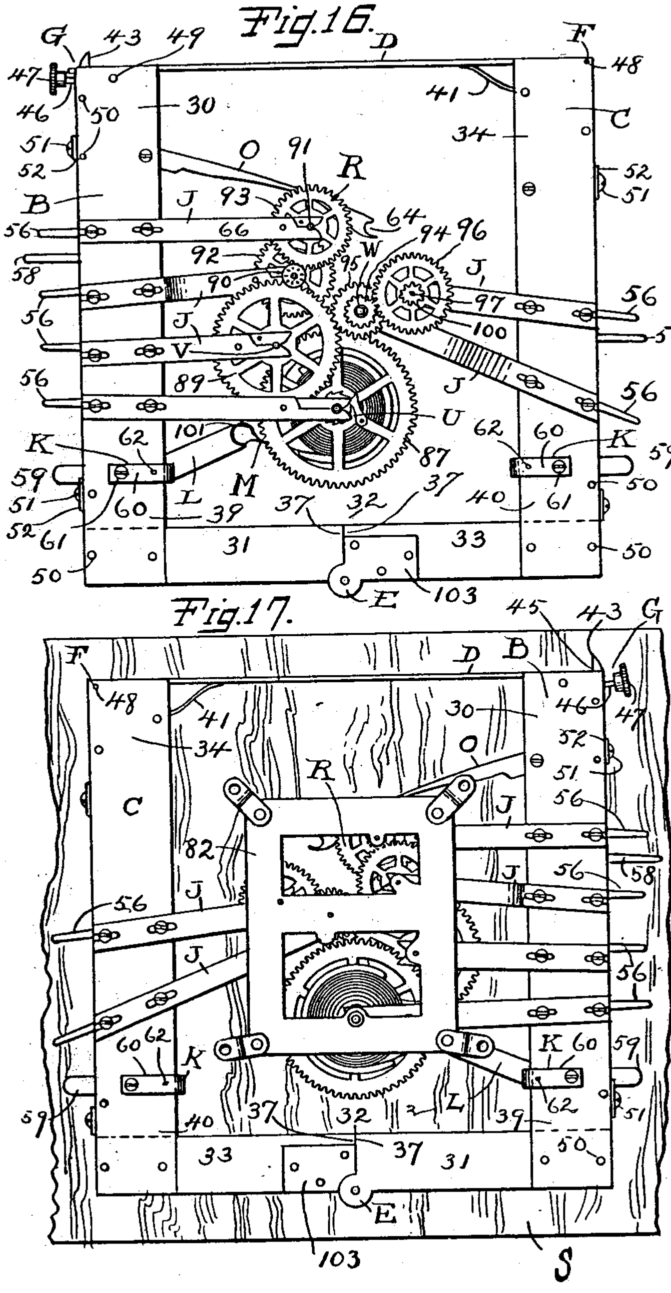
Fig. 16. Fig. 17.
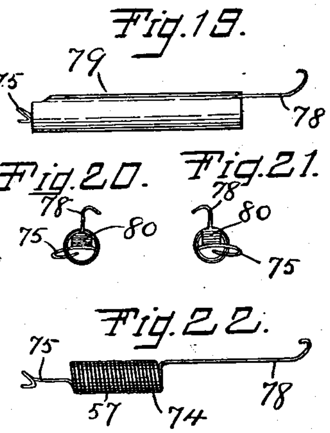
Fig. 19. Fig. 20. Fig. 21. Fig. 22.
Fig. 18.
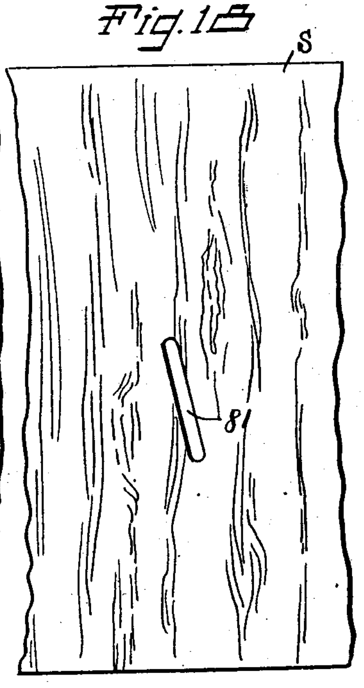
Witnesses
S. H. Clarke
Roger Edwards.
Inventor
William H. Gill.
By Louis M. Schmidt
Atty.
COLUMBIA PLANOGRAPH CO., WASHINGTON, D. C.

W. H. GILL.

CLOCK ASSEMBLING MACHINE.

APPLICATION FILED DEC. 6, 1911.

1,048,821.

Patented Dec. 31, 1912.

Witnesses.

S. H. Clarke

Roger Edwards

Inventor.

William H. Gill

By Louis M. Schmidt

Atty.

COLUMBIA PLANOGRAPH CO., WASHINGTON, D. C.

W. H. GILL.
CLOCK ASSEMBLING MACHINE.
APPLICATION FILED DEC. 6, 1911.
1,048,821.
Patented Dec. 31, 1912.
7 SHEETS—SHEET 6.
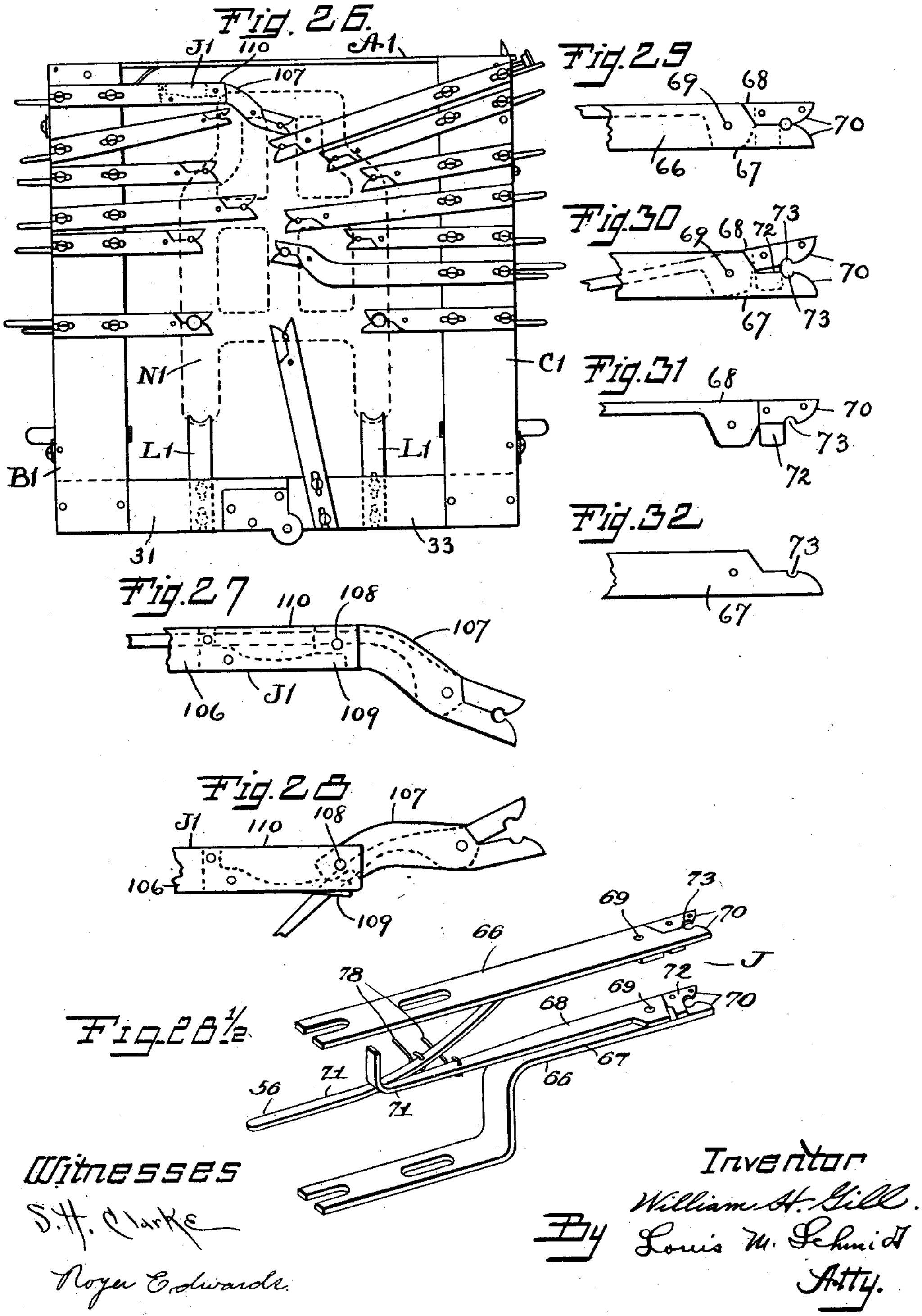
Fig. 26. Fig. 29. Fig. 30. Fig. 31. Fig. 32. Fig. 27. Fig. 28. Fig. 28½.
Witnesses
S. H. Clarke
Roger Edwards
Inventor
William H. Gill.
By Louis M. Schmidt
Atty.

W. H. GILL.

CLOCK ASSEMBLING MACHINE.

APPLICATION FILED DEC. 6, 1911.

1,048,821. Patented Dec. 31, 1912.

Witnesses:

S. H. Clarke

Roya Edwards.

Inventor

William H. Gill

By Louis M. Schmidt

Atty.

COLUMBIA PLANOGRAPH CO., WASHINGTON, D. C.

UNITED STATES PATENT OFFICE.

WILLIAM H. GILL, OF NEW BRITAIN, CONNECTICUT.

CLOCK-ASSEMBLING MACHINE.

1,048,821. Specification of Letters Patent. Patented Dec. 31, 1912.

Application filed December 6, 1911. Serial No. 664,270.

*To all whom it may concern:*

Be it known that I, WILLIAM H. GILL, a citizen of the United States, residing at New Britain, in the county of Hartford and State of Connecticut, have invented certain new and useful Improvements in Clock-Assembling Machines, of which the following is a specification.

My invention relates to improvements in clock assembling machines and the object of my improvement is to provide means suitable for facilitating the operation of assembling clocks, whereby the said operation will be performed in a manner that is simple, efficient and reliable, and in a short period of time.

In the accompanying drawings:—Figure 1 is a plan view of my machine for assembling clocks, showing the frame in the closed position and the jaws of the holding clips open. Fig. 2 is a view of the left side of the same. Fig. 3 is a view of the right side of the same. Fig. 4 is a view of the rear end of the same. Fig. 5 is a view of the front end of the same. Fig. 6 is a reverse plan view of the same. Fig. 7 is a view similar to Fig. 1, of a part of the same, in part broken out. Fig. 8 is a view similar to Fig. 1, showing jaws of the clips in the closed position. Fig. 9 is a view similar to Fig. 2 with the finger releasing plate removed. Fig. 10 is a plan view of the machine on a reduced scale and in the open position, with one of the clock members in position in the corresponding jaws. Figs. 11, 12, 13, 14 and 15 are views similar to Fig. 10 with successive additional clock members inserted in the proper jaws. Fig. 16 is a view similar to Fig. 1 and on the same scale, with the clock members shown in Fig. 15 in position in the jaws. Fig. 17 is a reverse view of the parts shown in Fig. 16 and the supporting board and with a part of the frame in place. Fig. 18 is a plan view of a part of the supporting board. Fig. 19 is a side elevation of one of the clip springs and the inclosing sleeve therefor, on an enlarged scale. Fig. 20 is a view of one end of the same. Fig. 21 is a view of the other end of the same. Fig. 22 is a side elevation of the clip spring only. Fig. 23 is a view in part broken out, of the parts shown in Fig. 17 and on the same scale, and with the hour member in position. Fig. 24 is a similar view of the same and with the front plate of the frame and the escapement member in place, and the holding screws in place, the several parts being in their final assembled positions. Fig. 25 is a similar view of the same, with the machine in the open position, and the clock free from the same. Fig. 26 is a view similar to Fig. 6 of a modification of my machine. Fig. 27 is a plan view on the same scale as Fig. 19, of one of the clip members shown in Fig. 26. Fig. 28 is a similar view of the same in one of the positions in use. Fig. 28½ is a perspective view of one of the clips. Fig. 29 is a similar view of the jaws of one of a pair of clips. Fig. 30 is a similar view of the same in the open position. Fig. 31 is a similar view of one of the clip members shown in Figs. 29 and 30. Fig. 32 is a similar view of the other clip member. Fig. 33 shows the parts shown in Fig. 25 and on the same scale in part broken out, and with the clock machine in partially open position. Fig. 34 is a similar view showing a modification of the flexible stop arm. Fig. 35 is a plan view of a modification of the clip on the same scale as Fig. 27.

A is my machine for assembling clocks and comprises when in the closed position a rectangular and essentially square framework consisting of a pair of left and right body members B and C hinged together at E and composing the sides and front end of the square or rectangle and a bridging member D forming the rear end of the same.

The left body member B comprises an L shaped member consisting of the arm 30 constituting the left side of the square and a branch arm 31 extending inwardly from the front end thereof and forming about one half of the front end 32, the inner end being joined by a hinge connection E with the inner end of a branch arm 33 of the right body member C. The right body member C comprises a reversed L shaped member having the arm 34 constituting the right side of the square and the said branch arm 33 extending inward from the front end thereof to the hinge connection E which branch arm 33 constitutes the remaining half of the front end 32 of the square. The hinge connection E permits moving the members B and C relatively to one another in a horizontal plane when the upper ends of the arms or sides 30 and 34 are free and disengaged. Normally the said upper ends are cross-connected by the bridging member D. As shown the said bridging member D is a flat plate, joined by the edge at one end to the upper end of the arm 34 of the right body member C by a spring hinge F and is removably secured to the upper end of the arm 30 of the left body member B by means of a spring latch G. Extensions or projections 35 on the upper ends of the left side or wall 30 engage with recesses 36 in the bridging member D and serve as positioning members to positively position the same.

I prefer to have the hinge connection E of the body members B and C provided with engaging shoulders 37 or equivalent means to position the body members B and C when in the closed condition so that the bridging member D may be swung on its pivot or hinge F and positively engage the latch members of the latch G with one another, and also engage the positioning members 35 and 36 with one another and thereby insure a proper positioning of the body members B and C relatively to one another. The body members B and C comprise each a skeleton framework having similar and parallel top and bottom L shaped walls, suitably spaced and secured together by means of cross-connecting posts or plates 38 or equivalent means. The left body member B has similar parallel top and bottom walls 39 consisting each of an L shaped plate of sheet metal, the front inner ends of which are provided with hinge members forming part of the hinge connection E and the rear ends of the sides 30 are suitably shaped to provide the projections 35 described that fit the recesses 36 and coöperate therewith as positioning means, and the said rear ends are furthermore provided with one of the members of the latch G to be described. Similarly the right body member C has parallel top and bottom walls 40 consisting each of a reversed L shaped plate of sheet metal, the front inner ends of which are provided with hinge members which form part of the hinge connection E and on the rear ends are connected by the hinge F to the bridging member D.

The spring hinge F comprises a pair of pivotal points 48, shown as integral with the lateral edges of the bridging member D engaged with holes in the top and bottom walls 40 of the right side 34 and a leaf spring 41 that is supported from the right upper cross-connecting plate 38 of the said right side 34, bears against the body of the bridging member D, and operates to spring the same open when released from the latch G.

The latch G comprises a spring member 42 that is secured to the upper left cross-connecting plate 38 of the left side 30, and extends upwardly having a notched head 43 at the upper end that is suitable for passing through a keeper hole 44 near the left end of the bridging member D and having its nose 45 engage with the outer edge of the said hole 44 and serves to hold the bridging member D in the closed position.

A trigger 46 is secured to the body of the spring member 42, extends outwardly to the left and at the outer end has a head or knob 47 conveniently positioned to the left of the left side 30 so that the same may be operated by a blow to disengage the nose 45 from the keeper hole 44 and thereby release the bridging member D and permit the same to be sprung open by the spring hinge F as described.

A cross bar or pin 49 may serve to limit the inward movement of the free or latch end of the bridging member D when brought to the closed position.

The cross connecting plates 38 fit in between the top and bottom walls 39 and 40 of the body members B and C, there being two for each side wall 39 and 34, located along the lateral edges and near the front and back ends thereof, and are secured by integral rivets 50 engaged with holes in the top and bottom walls 39 and 40. There are two rivets 50 on each side of each cross-connecting plate 38, which are appreciably separated, whereby the cross-connecting plates 38 and the top and bottom walls 39 and 40 are rigidly secured together and the cross-connecting plates 38 serve as an interrupted side wall, suitable for supporting other devices. As already described, the upper cross-connecting plates 38 serve to support the spring 41 of the spring hinge F on the right side and the spring member 42 of the latch G on the left side.

Each of the side arms 30 and 34 is provided on the outer side with a slide plate respectively H and I, slidably mounted on the cross connecting plates 38, by means of screws 51 and washers 52, or equivalent means. As shown, the screws 51 engage with longitudinal guide slots 53 in the slide plates H and I.

The slide plates H and I, are each provided with a plurality of longitudinal clip handle slots 54 limited at the back end each by a back edge or bridge 55, which slots receive each a laterally extending handle 56 of a clip J and permit a limited movement thereof, and are positioned so that normally the said handles 56 are engaged with the bridges 55 and with the clips J held in the open positions by the clip springs 57. As shown the left slide plate H is provided with two guide slots 53 and in line therewith, four clip handle slots 54 and bridges 55 and the right slide plate I has two guide slots 53, two clip handle slots 54 and two bridges 55, the lower guide slot 53 and clip handle slot 54 being merged into one extended slot, limited at the back end by the bridge 55. The slide plates H and I are appreciably narrower than the cross-connecting plates 38 and the space between the top and bottom walls 39 and 40 and each is provided at the upper edge, preferably as shown, near the front end with a notch 57 which serves as a keeper for a spring catch K that operates to hold the slide plates H and I in the forward position after they have been pulled to such position. An operating handle 58 is provided for each of the slide plates H and I, comprising in each case a laterally directed arm or projection.

The spring element 104 of the catch K is secured to the upper wall H and I and comprises an arm 59 extending laterally from the under side of the said wall and is normally in resilient engagement with the top edge of the slide plate and operative to engage with the notch or recess 57 when the latter is brought into registration therewith. The said arm 59 extends laterally beyond the line of the slide plates H and I so that the outer end thereof serves conveniently as an operating handle for lifting the arm out of engagement with the recess 57, and the inner end is secured to the upper wall 39 and 40 of the body members B and C. As shown, the said spring element 104 has its inner end provided with a return bend, turned over the inner edge of the upper wall 39 and 40, and in abutment with the front face of the said upper wall, and the inner end proper 60 is secured to the said upper by means of a holding screw 61 and positioning pin or rivet 62.

The hinge E is a duplex construction comprising a pair of similar hinge structures 103 connecting respectively the top walls 39 and 40 of the body members B and C and the bottom walls 39 and 40 thereof.

As described, my machine for assembling clocks or clock machine comprises a frame work having a pair of body members B and C of skeleton construction hinged at E; provided with a bridging member D suitable for holding the same in the closed position; having a pair of slide plates H and I along the lateral edges or sides normally held in one position; means for moving and catching the slide plates and hold them away from the normal position; and a plurality of clips J having handles operatively engaged with the said slide plates.

The left side 30 is provided near the front end with a rigid, inwardly directed arm L secured to the lower wall 39 of the left body member B and having the inner end 63 arc shaped, suitably to serve as a stop to guide and position the outer end of the main spring M of the clock N in the clock assembling operations to be described. The left side 30 is provided near the rear end and also secured to the lower wall 39, with an inwardly directed flexible stop arm O having the inner end 64 suitably shaped to position the lower end of the crown or escapement wheel member P. The arm O is made of resilient material and is also of reduced thickness between the outer free end 64 and the point of attachment of the same to the side 30, as shown at 65, and peculiarly shaped as shown. The shape of the said flexible stop arm O is such as to permit the same to clear the adjacent part of the frame Q of the clock N during the assembling operations, and the feature of flexibility thereof permits the same to be pushed and bent away from its normal position by coming in contact with certain parts of the clock during the operation of opening the clock machine A after the completion of the assembling operations.

The left body member B is provided with four and the right body member C with two clips J. The said clips J comprise each a duplex holding device comprising a pair of coöperative holding devices or individual holders 66, respectively an upper holder and a lower holder, which are in vertical alinement. The individual holders 66 comprise each a pair of jaw members extending inwardly from the sides 30 and 34 of the body members B and C, respectively a fixed jaw member 67 and a movable jaw member 68 which are pivotally connected by means of a pin 69 adjacent the inner, free ends. The said inner free ends 70 are formed suitably for jaws for holding clock elements that are to be assembled within the clock frame Q. The two fixed jaw members 67 of each clip J are rigidly secured to the exterior face of the top and bottom walls 39 and 40 of the body members B and C, one to the top wall and the other to the bottom wall. The movable jaw members 68 extend from the pivotal point 69 outwardly laterally into the space between the top and bottom walls 39 and 40 where the outer ends of the pair of the individual movable jaw members 68 comprised in each clip J are united and extend laterally in the form of the single handle 56 already referred to as passing through the clip handle slots 53 in the sliding plates H and I and engaged with the bridges 55.

I prefer to have each of the individual movable jaw members 68 of each clip J essentially free in its movements and independent of the other, except that they will both be responsive to a movement of a single handle 56 in effecting the opening of the same and accordingly I provide each of the same with an individual clip spring 57 operative to tend to close the jaws 70, to have the free arms 71 bent so that one crosses or overlaps the other, and adjacent or in contact therewith and the rearmost of the two overlapping arms 71 is extended laterally to form the said operating handle 56. A forward movement of the handle 56 brings the arm 71 integral therewith into abutment and sliding contact with the mating arm 71 and accordingly effects an opening of the jaws 70 of both of the individual holders 66 of the clip J.

Normally the clip springs 57 tend to keep the jaws 70 in the closed position and through contact of the clip handles 56 with the bridges 55, tend to hold the sliding plates H and I in their rearmost positions, and a forward movement of the sliding plates H and I by means of the sliding plate handles 58 operates to open all of the clips J connected by means of the clip handles 56 with the particular sliding plate H and I that is so moved, and if moved so that the recess 57 registers with the spring arm 59 of the catch K the said catch serves to hold all of the said clips J in the open position as shown in Fig. 1. Each jaw 70 comprises a semi-circular slot or recess 73 that coöperates with the corresponding slot or recess 73 in the mating jaw 70 to receive and positively hold or position the shaft of the particular clock member that the particular clip J is designed to hold during the assembling operation. The free ends of the jaws 70 inward from the positioning recesses 73 may be shaped as shown to form a V shaped recess leading from the tip ends of the jaws into the said positioning recesses. The jaws 70 of the three rearmost clips J mounted on the left body member B are provided with guards 72 at the pivotal side of the positioning recesses 73 that serve to limit the entry of the clock members in the jaws 70 to the position of the said recesses 73. As shown, the said guards 72 comprise a plate secured to the moving jaw 70 and having an extension extending across the opening between the two jaws 70.

The clip springs 57 are coil springs comprising the usual cylindrical coil body 74 and the ends extending therefrom, the upper end 75 being secured in an ordinary manner to the inner side wall of the body members B and C as by means of a screw 76 and a nut 77 or equivalent means, and the lower end 78 being provided with a loop for engaging with the operating arm 71 of the individual holders 66 of the clips J. As a means of insuring free and independent action of the individual clip springs 57 I provide each of the same with a housing or jacket 79 in the form of a cylinder that incloses the said cylindrical body portion 74 of the clip spring 57 and as a means of retaining the same in position I provide a tongue 80 by bending inward a portion of the upper end of the jacket 79, forming a projection that is suitable to engage with the adjacent end of the said body portion 74 when inclosed by the jacket 79 and thereby prevent the removal of the jacket by a downward movement thereof. Removal of the jacket 79 in the opposite, or upward direction is prevented by the holding screw 76.

The supporting board S comprises a plane topped board, table top, or bench and is provided with an elongated slot 81 or equivalent means for receiving certain projecting parts of the clock N, such as the winding stems, during certain stages of the assembling operations.

The clock N to which my clock machine A is adapted comprises a housing or frame of the usual skeleton construction having a back plate 82 to which the four corner posts 83 are attached and a front plate 84 which is secured to the corner posts 83 by screws 85. The front plate 84 is provided with a forwardly projecting bracket T which supports the front end of the shaft of the crown wheel or escapement wheel member P, whereby the crown or escapement wheel 86 is positioned in front of the body of the front plate or plate proper 84. The operative parts of the clock members other than the said escapement wheel 86 are positioned between the body of the front plate 84 and the back plate 82.

The clock members comprise the first clock member U which has mounted on its shaft the main spring M already mentioned, the first or driving wheel or gear 87 and is also provided with spring winding means, comprising a squared end for the front end 88 of the shaft suitable for receiving the key. The second clock member V comprises a shaft on which is mounted a pinion that meshes with the first wheel or driving wheel 87, and the second wheel or gear 89. The second wheel 89 serves through intermediate gearing to operate the crown wheel 86 and also the dial hand mechanism. The said intermediate gearing comprises the third clock member 90 and the fourth clock member 91, each of which comprises a shaft on which is mounted a pinion and the third gear 92 and fourth gear 93 respectively. The said dial hand mechanism comprises the center member W having a shaft which is adapted to carry the minute hand and on which shaft are mounted a pinion 94 and a gear 95 that meshes with the second gear 89. The said pinion 94 serves to operate the hour hand through the gear 96 of the hour hand intermediate clock member 97 with which it meshes. The hour hand member X comprises a sleeve 98 that is suitable for receiving the hour hand and which sleeve is operatively mounted on the shaft of the center member W and on which sleeve is mounted the hour hand wheel or gear 99. The shaft of the center member W and the sleeve 98 thereon project suitably forward to properly position the dial hands. The said hour hand intermediate clock member 87 comprises a shaft on which are mounted the gear 96 mentioned that meshes with the center shaft pinion 94 and a pinion 100 that meshes with the hour hand wheel or gear 99.

Fig. 10 shows my machine at the initial stage of use, the board on which the same rests being omitted, and the first clock member or main spring member U inserted in the first or front clip J of the left body member B. In this position it will be noted that the clips J are closed, being retained closed by the clip springs, and they are individually opened by the clip spring handles as the clock members are successively inserted.

Figures 1, 2, 3, 4, 5:
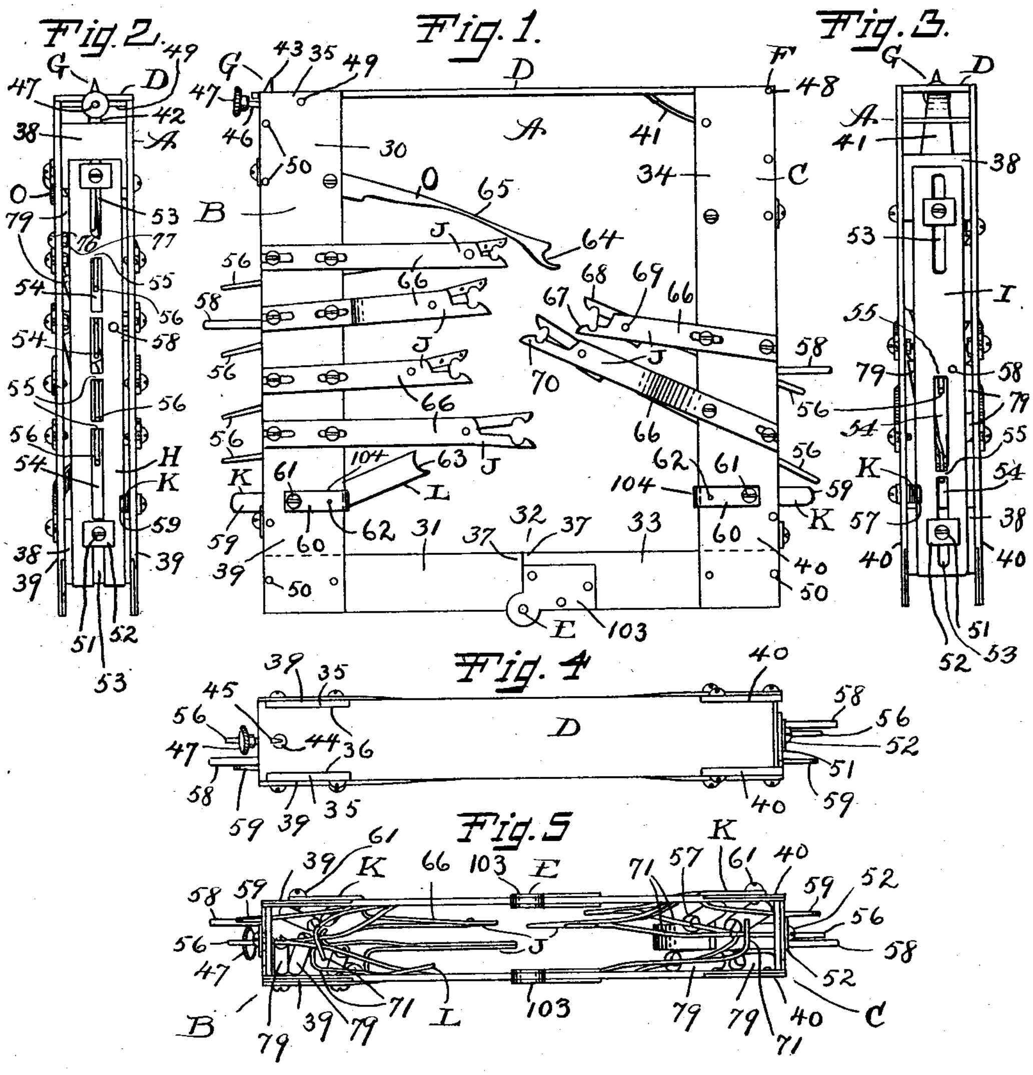
Figure 6:
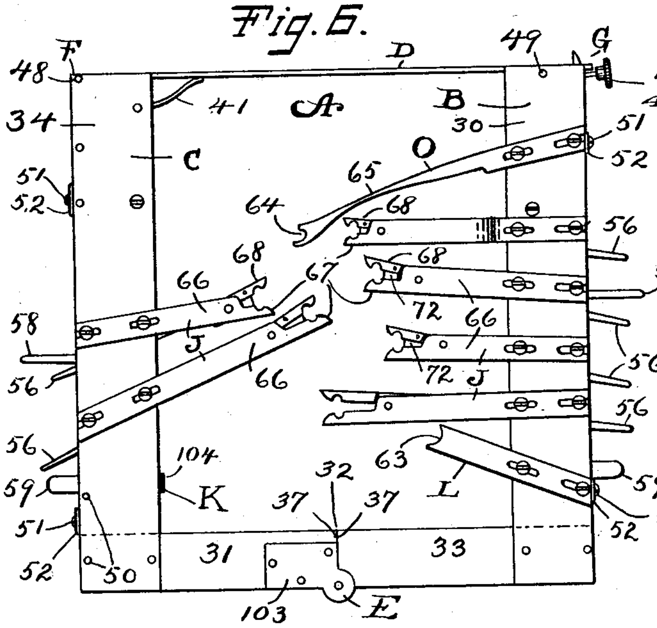
Figure 7:
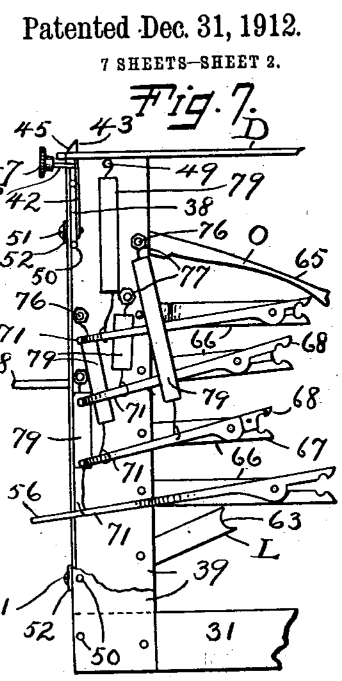
Figure 8:
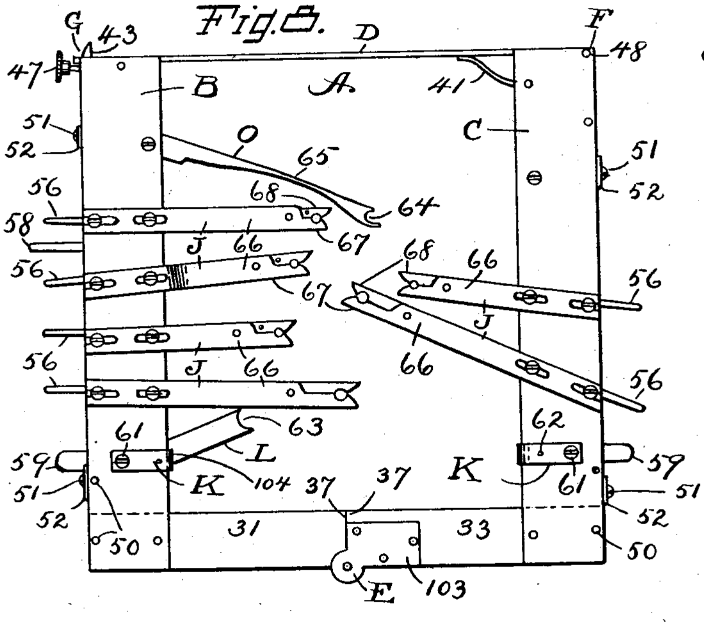
Figure 9:
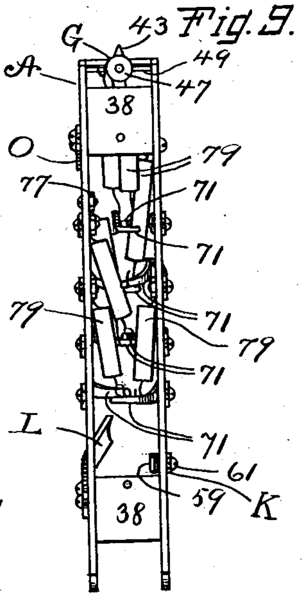

The second and third clips J have jaws provided with guards 72 and the first clip J does not have such guards, while the fourth clip has a guard provided for the upper individual holder 66 and has no guard for the lower individual holder 66.

The free end 101 of the main spring M comprises the usual sleeve for receiving one of the posts 83 of the frame of the clock N, and in placing the first clock member U in its clip J the said main spring end 101 is placed in abutment with end 63 of the fixed stop L, which is located so as to suitably position the said end to register with and receive the said post 83 when the back plate 82 to which the said post is attached is placed in position over the clock member.

Figures 10, 11, 12, 13, 14, 15:
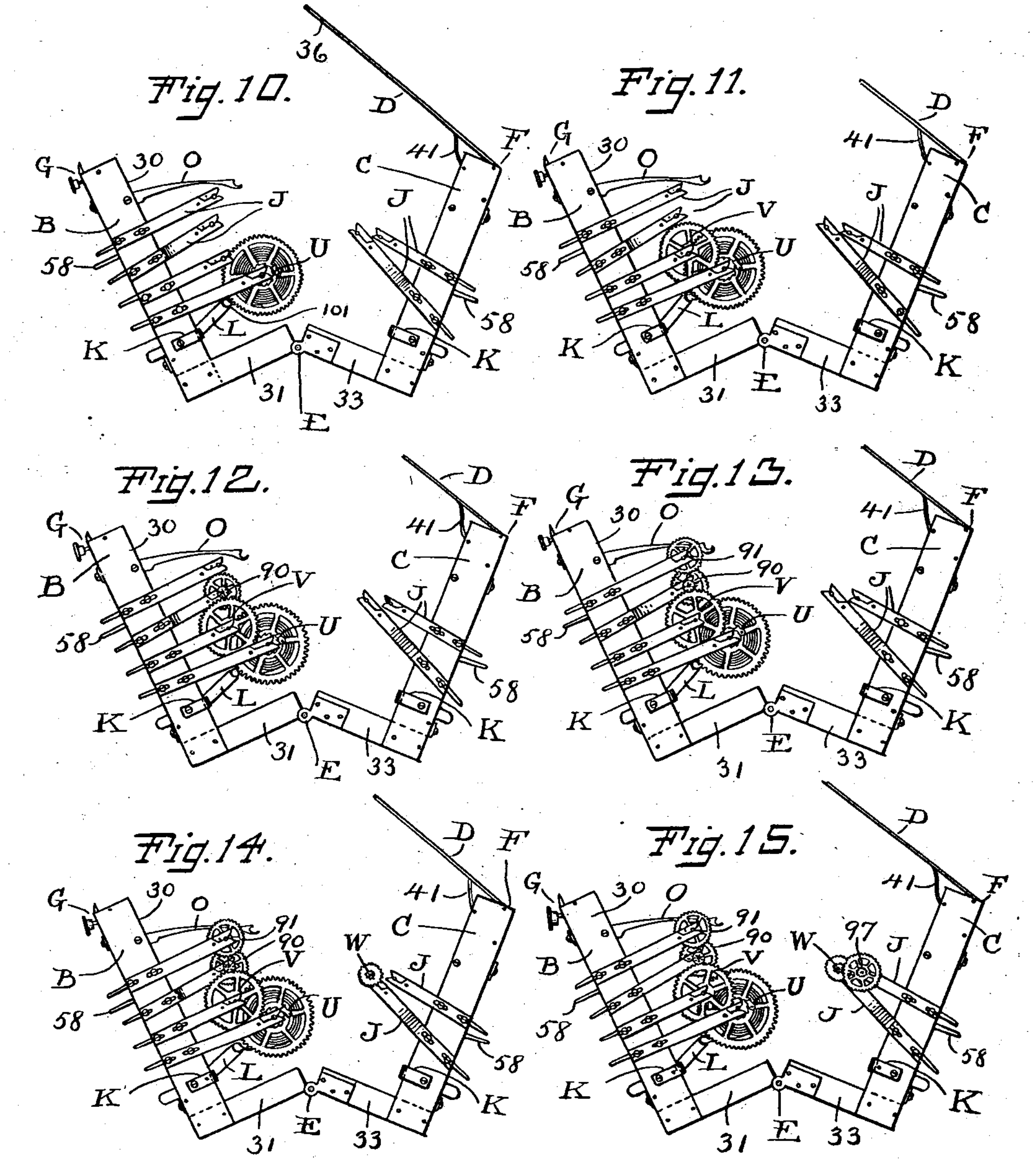
Fig. 11 shows the next step in the operation of assembling, with the second clock member V in the second left clip J.
Fig. 12 shows the next step with the third clock member 90 inserted in the third left clip J.
Fig. 13 shows the next step, with the fourth clock member 91 in the fourth clip J.

In the operations described the clips J in the left member B of the machine A have all been filled with the clock members they are designed to hold and the next operation is to fill the clips J in the right body member C, it being understood that the order of filling the said clips J of the right and left body members B and C may be changed if desired. In filling the clips J of the right body member C the center clock member W is first placed in the front or first clip J and then the hour hand intermediate member 97 is placed in the second clip J as shown respectively in Figs. 14 and 15. The lower individual holders 66 of the clips J of the right body member C are provided with guards 72 and the upper individual holders 66 do not have such guards. The next operation is to close the machine A, as shown in Fig. 16, locking the same by engaging the bridging member D by the latch G, which results in positioning the clock members in their relations one to the other and so that their shaft ends will engage with the bearings provided for them in the front and back plates of the frame when the said frame plates are placed thereon, as in the operations next in order.

Figure 23:
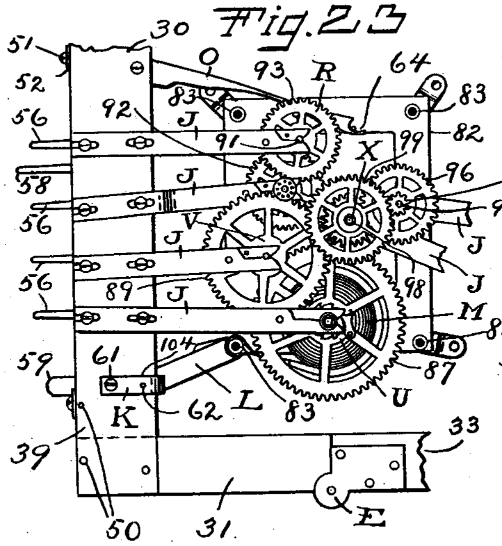
Figure 24:
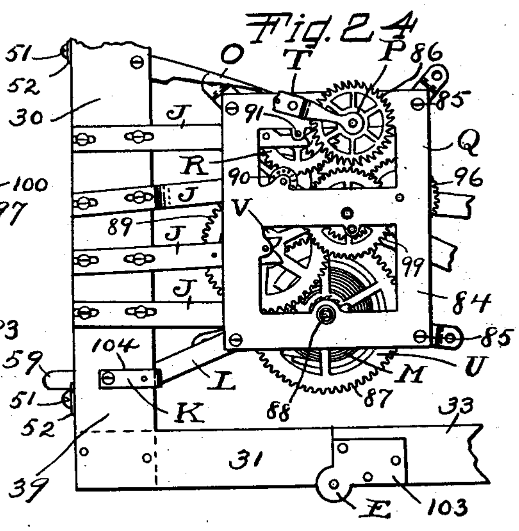
Figure 25:
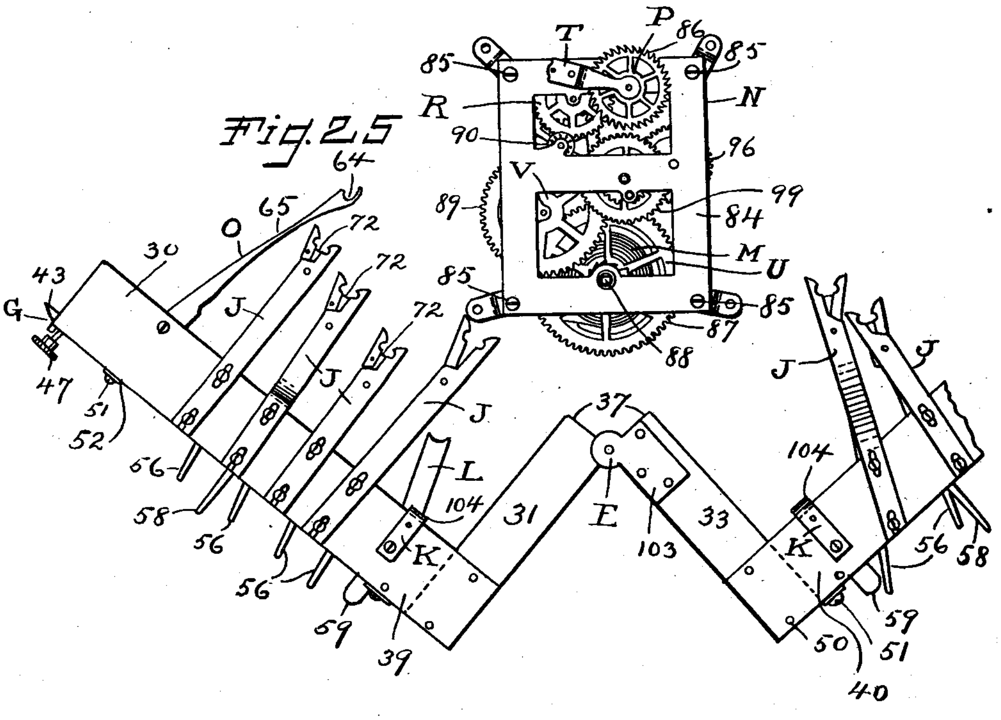
Figures 33, 34:
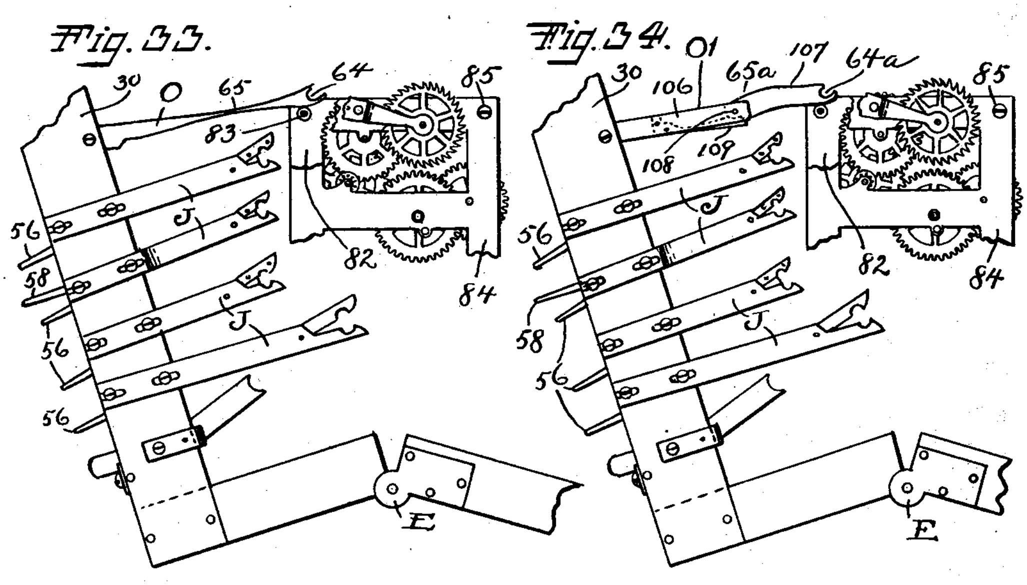

The first operation toward placing the plate frames in position is to invert the machine A with the clock members therein as described and as shown in Fig. 17, setting the same on the board S, the stems of the center member and main spring member entered in the slot 81, and then the back plate 82 is placed in position, also as shown in Fig. 17 the post 83 adjacent the main spring M being entered into the sleeve described at the spring end. The machine A is next turned back again to normal position, as shown in Fig. 23. In the next operation the crown wheel member P is inserted in position in the front plate 84 of the frame, the front end of its shaft being entered in the bearing provided therefor in the forwardly projecting bracket T on the said front plate 84, as shown in Fig. 24, after which the front plate 84 is placed in position, during which the lower end of the crown wheel member P is guided or positioned so as to enter the bearing provided therefor in the back plate 82 by being brought into abutment with the end 64 of the flexible stop arm O. After the back plate 82 and crown wheel member P have been placed in position as described the screws 85 are inserted in the posts 83, completing the assembling. The next operation is the removal of the machine A from the clock N. The first operation in such removal consists in opening the clips J by operating the slide plates H and I by means of the slide plate handles 58 and moving the same so that they will be engaged by the catch K so that the clips J will be locked in open positions. Thereupon the latch G is operated to release the bridging member D by striking a blow on the button 47, permitting the spring 41 to open the same. The machine A is then brought to the open position, and the clock N entirely freed therefrom as shown in Fig. 25. Intermediate the closed position and the full open position of the machine A as shown in Fig. 25 I find that the head of the flexible stop arm O adjacent the extreme end 64 follows a path that brings the same in contact first with the pinion of the fourth clock member 91, and then with a corner post 83 as shown in Fig. 33. Accordingly, I make the said arm O of resilient material, so that the arm O will bend and give way to such contact, in order to permit freely such opening of the machine and without damage to the clock members.

In the modification of the flexible stop arm shown in Fig. 34 the desired flexibility is obtained by a jointed body $65^a$ having a fixed arm 106 and an extension 107 thereof pivoted to the said fixed arm 106 at 108 and held in normal position by a spring 109, the construction shown corresponding essentially to a jack-knife structure.

Fig. 26 shows a machine $A^1$, suitable for assembling a striking clock $N^1$, having a pair of springs M. The fixed stops $L^1$ for guiding the sleeve ends of the springs are here shown to be fixed to the front portions 31 and 33 of the body members $B^1$ and $C^1$. In Figs. 27 and 28 are shown clips $J^1$, having bodies 110 provided with the jack knife construction shown in Fig. 34 as applied to the flexible stop $O^1$, a construction that permits the clip ends to be moved past clock parts that are in the path of the same during the operation of removing the machine $A^1$ from the clock $N^1$.

Figure 35:
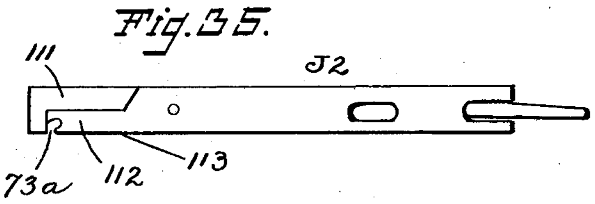

In special cases clock members are positioned close together, and in such cases I find it necessary to provide a special clip $J^2$, such as shown in Fig. 35, having one jaw 111 overhanging the other jaw 112 and the positioning recesses $73^a$ positioned adjacent one edge 113, as shown.

I find that by arranging the clock members in groups as described, one group comprising the main spring and the adjacent mechanism and the other group comprising the center shaft and adjacent mechanism, the two groups can be brought together into a single group and with the clock elements positioned in proper coöperative relation one to the other and suitable for receiving the parts of the clock frame and have the said parts secured together so that the clock elements will be operatively housed in the said clock frame.

Differences in details of operation will be found necessary for assembling different clocks. For instance, it will be noted that in the use of the machine A I have the machine in one position while placing the clock members therein, except the crown wheel member which is placed in position at the same time as the front plate of the frame, then I reverse the machine to receive the back plate of the frame, and then again and finally I bring the machine back again to the first or normal position, after which the front plate of the frame is placed in position with the crown wheel member as mentioned and the holding screws applied to secure the frame parts together.

When, however, the machine $A^1$ is used for assembling the striking $N^1$ clock, shown in Fig. 26, and which clock is of a different make from the clock N for which the machine A is designed, in the first operation of inserting the clock members the machine $A^1$ is in the position shown in Fig. 26 and which may be said to be the reverse position as related to the first position for the machine A and as shown in Fig. 1.

In the use of my process the clock members of a clock are divided into groups, that can be brought together to form essentially a unitary structure so that the parts of the clock frame can be applied thereto directly, and the said clock parts secured together so as to operatively house the clock members.

In other words, the coöperative rotative elements of the clock are supported and positioned as a unit in their proper relative positions and the supporting plates of the frame are applied thereto while so supported and positioned.

I claim as my invention:—

1. A clock machine comprising a frame work consisting of a pair of body members connected by a hinge connection, the said body members suitably shaped to inclose a central space, means supported by the said members, extending into the said space, and operative to support the coöperative elements of a clock so as to facilitate the assembling thereof in a clock frame in which they are to be operatively housed.

2. A clock machine comprising a frame work consisting of a pair of body members connected by a hinge connection, the said body members suitably shaped to inclose a central space, receiving means carried by said members, projecting into the said space, and suitable for receiving the moving and coöperative elements of a clock, and for supporting the said members in position for receiving a clock frame in which they are to be operatively housed, and retaining means for retaining the said members in the closed position.

3. A clock machine comprising a frame work consisting of a pair of body members connected by a hinge connection, the said body members suitably shaped to inclose a central space, receiving means carried by said members, projecting into the said space and suitable for receiving the moving and coöperative elements of a clock, and for supporting the said members in position for receiving a clock frame in which they are to be operatively housed, and retaining means for retaining the said members in the closed position, and a spring latch serving to secure the said retaining means in the closed position.

4. In a clock machine, a frame work comprising a pair of L shaped body members pivotally connected by their inner ends, and provided with means for receiving and supporting the coöperative elements of a clock, a bridging member serving to cross-connect the outer ends thereof, the said bridging member connected to one of the said body members by a hinge connection and a latch serving to connect the said bridging member to the other of the said body members.

5. A clock machine comprising a frame work, the said frame work inclosing a central space, a plurality of spring clips carried by the said frame work, extending into the said space, and operative to support coöperative elements suitable for receiving the frame in which the said elements are to be operatively housed.

6. A clock machine comprising a framework having a plurality of body members, the said members provided each with means for receiving and holding a portion of the operative elements of a clock, and the said members connected together suitably to hold the said elements in position to receive the housing clock frame.

7. A clock machine comprising a frame consisting of a pair of body members connected by a hinge connection at one end and having means for separably connecting the other end, means carried by one of the said body members for receiving and holding a group of clock elements comprising a main spring and the operatively adjacent gearing of a clock, means carried by the other of the said members for receiving and holding a group of clock elements comprising the center member and coöperative dial hand transmission mechanism, and the said body members when in the closed position serving to hold the said groups in the normal coöperative position and suitable to receive the housing clock frame.

8. A clock machine comprising a framework, means on said frame-work for receiving and holding the clock elements during the operation of assembling a clock, a fixed stop provided on the said frame work suitable for positioning the sleeve-like end of the main spring for receiving the frame post on which the said sleeve is mounted.

9. A clock machine comprising a framework consisting of a pair of body members having means for being connected together, a clip provided on one of the said members serving to hold and position the main spring of a clock generally and a fixed stop on the last mentioned body member suitable for positioning the free end of the main spring.

10. A clock machine comprising a framework for positioning the clock elements of a clock comprising a crown wheel member suitable for receiving the housing clock frame, a stop arm provided on the said frame work and operative to position the said crown wheel member.

11. A clock machine comprising a framework consisting of a pair of body members connected by a hinge connection at one end, means for separably connecting said members at the other end, and means carried by the said members for receiving and positioning clock elements, and comprising a stop arm secured by one end to the said framework and having the other free end suitable for positioning one of the said clock elements, the said arm intermediate the said ends provided with a flexible and resilient portion operative to permit a deviation of the said free end from the normal position.

12. A clock machine comprising a pair of body members hinged together, a plurality of clips provided on the said member, suitable for supporting clock elements, a fixed stop provided on one of the said members for positioning a part of one of the said clock elements, and a flexible stop arm also provided on the said member suitable for positioning another clock element.

13. A clock machine having a framework and a plurality of clips supported from the said framework and the said clips operative for holding and positioning the elements of a clock suitable for receiving the housing clock frame.

14. In a clock machine having a framework, a clip supported from the said framework, and the said clip comprising a duplex structure having a pair of fixed members and a pair of moving members coöperative and mating with the said fixed members.

15. In a clock machine comprising a framework, a plurality of clips on said framework suitable for receiving and positioning clock elements, one of the said clips comprising two pair of jaws suitable for receiving and holding a clock element, a guard provided on one of the said pair of jaws and operative to limit the amount of entry of the said clock element therein.

16. In a clock machine, a clip comprising a duplex structure having a pair of holders, each of the said holders comprising a fixed member and a moving member provided with jaws suitable for holding a clock element, a handle provided on one of the said moving elements and the other of the said moving elements positioned suitably to be engaged by the other moving element when moved by manipulating the said handle.

17. In a clock machine a framework, a plurality of clips supported therefrom, each of the said clips comprising a fixed member and a moving member pivotally connected thereto, a handle provided for each of the said clips, a slide plate engaged with a plurality of the said handles and operative to move the same so as to simultaneously release the clips corresponding to the said handles.

18. In a clock machine a framework, clips thereon operative to hold clock elements and provided with handles, a slide plate operative to engage with the said handles and bring the said clips to the open position, and means for engaging with the said slide plate and operative to lock the said slide plate so as to hold the said jaws in such open position.

19. In a clock machine, a plurality of clips operative to hold clock members while being assembled in the clock frame, handles provided on the said clips, springs operatively connected to the said handles and tending to hold the said clips in the closed position, a slide plate having engagement with the said handles, having a limited reciprocal motion, and normally held by resilient means in one limiting position and the said slide plate operative through such engagement with the said handles when moved from such normal limiting position to release the said clips, and a catch operative to engage with the said plate and lock the same with the said clip in such open position.

20. A clock machine having a frame and comprising a plurality of clips and a slide plate engaged with the said clips and operative to hold the same in the open position, a catch supported from the said frame comprising a spring having a laterally extending arm, the said slide plate provided with a recess that is operative in one position to receive and engage with the said arm.

21. In a clock machine, a framework, a plurality of clips supported therefrom and provided with operating springs, the said springs housed in the said framework, and inclosing jackets serving to inclose the body portions of the said springs.

WILLIAM H. GILL.

Witnesses:
SHEFFIELD H. CLARKE,
ROYA EDWARDS.

Copies of this patent may be obtained for five cents each, by addressing the "Commissioner of Patents, Washington, D. C."